A. GIBEAULT.
VEHICLE WHEEL.
APPLICATION FILED MAY 4, 1915.
1,162,474.
Patented Nov. 30, 1915.
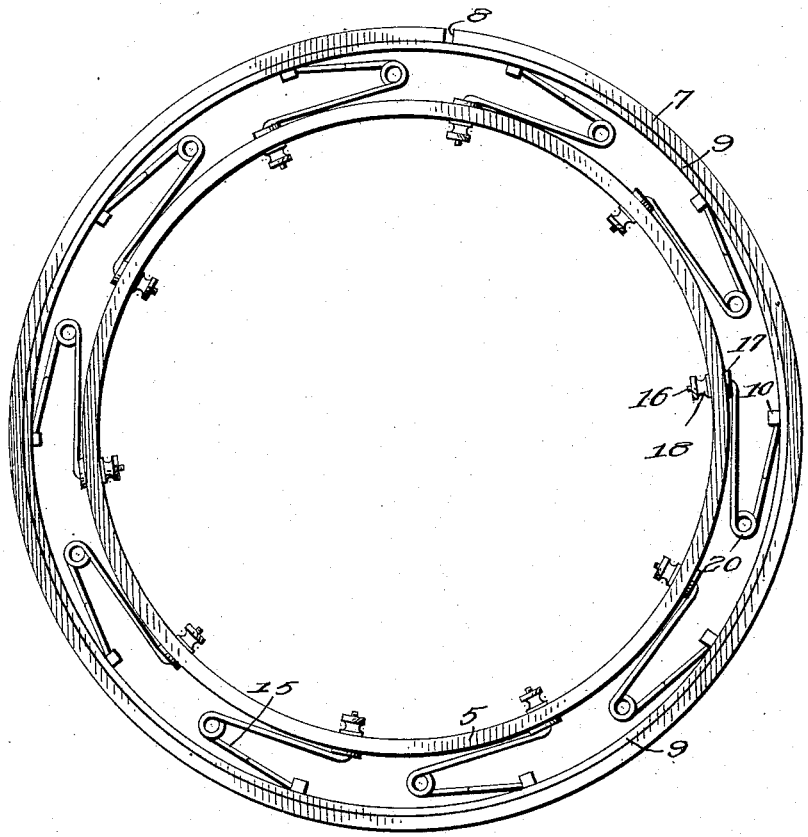
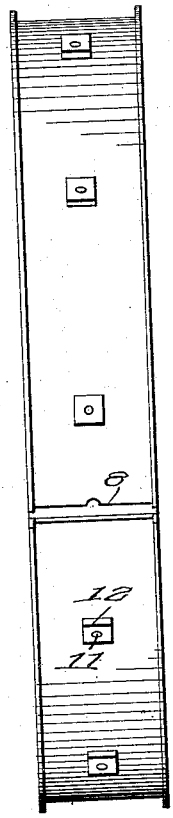
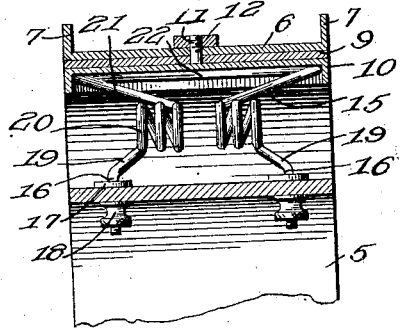
WITNESSES:
INVENTOR
ALPHONSE GIBEAULT
BY Munn & Co.
ATTORNEYS

UNITED STATES PATENT OFFICE.

ALPHONSE GIBEAULT, OF IRON MOUNTAIN, MICHIGAN.

VEHICLE-WHEEL.

1,162,474.  Specification of Letters Patent. Patented Nov. 30, 1915.

Application filed May 4, 1915. Serial No. 25,799.

*To all whom it may concern:*

Be it known that I, ALPHONSE GIBEAULT, a citizen of the United States, and a resident of Iron Mountain, in the county of Dickinson and State of Michigan, have invented an Improvement in Vehicle-Wheels, of which the following is a specification.

This invention relates to vehicle wheels and more particularly to a novel tire construction whereby the necessity for using pneumatic tires is obviated.

Briefly stated, the present invention consists in providing an inner and outer rim with a plurality of spring members interposed therebetween and secured thereto in a novel manner.

The primary object of the invention is the provision of a vehicle wheel which is simple in construction, light, durable, and calculated to effectively cushion the vehicle and eliminate shocks and jars thereto.

The inventive idea involved is capable of receiving a variety of mechanical expressions, one of which, for the purpose of illustrating the invention, is shown in the accompanying drawing, in which—

Figure 1 is a side elevation of the rim construction made in accordance with the invention. Fig. 2 is an edge elevation. Fig. 3 is an enlarged fragmentary cross section. Fig. 4 is a side elevation of the housing or casing used in connection with the invention.

Referring more particularly to the accompanying drawing in which like reference characters indicate similar parts, the numeral 5 indicates the inner rim of the wheel and 6 the outer rim thereof, the latter being provided with annular flanges 7 upon its edges whereby a solid rubber tire, not shown, may be securely retained in engagement with the outer rim. The outer rim 6 is split as indicated at 8 and adapted to encircle an annular ring 9. A plurality of housings or casings 10 are arranged interiorly of the ring 9 in spaced relation and extending transversely thereof. Said casings are each provided intermediate the ends thereof with a threaded extension 11 which passes through suitable apertures in the ring 9 and outer rim 6 and is adapted to receive upon its outer end the nut 12 whereby the ring 9 and housing 10 are securely fastened to the outer rim. When the rubber tire is in position between the flanges of the outer rim 6 the nuts 12 will engage the tire and prevent creeping thereof.

Each of the housings 10 is preferably of rectangular formation and has the side 13 thereof terminating short of the ends of the housing to provide openings 14 for a purpose which will presently appear.

A plurality of spring members 15 are interposed between the outer and inner rims and each spring has its ends 16 securely fastened in the inner rim 5 which is provided with openings for receiving said ends. Each end 16 of the spring 15 has secured thereto a washer 17 adapted to abut against the outer face of the inner rim and a nut 18 is threaded upon the end of the spring and engages the inner face of said rim, thereby securely anchoring the terminals of the spring thereto. The ends of the spring are bent to provide the converging portions 19 which terminate in coils 20 extending transversely of the inner and outer rims. The inner ends of the coils 20 are continued to provide diverging portions 21 the outer ends of which enter the openings 14 of the housing 10, said outer ends being finally bent to provide a central portion 22 which extends longitudinally of the housing 10 and engages the side thereof opposite the side 13. It will thus be seen that the springs 15 are securely held in position between the inner and outer rims, the central portions 22 thereof being prevented from moving longitudinally of the outer rim by the sides of the housing 10.

I claim :—

1. A vehicle wheel comprising inner and outer rims, an annular ring engaging the inner surface of said outer rim, a plurality of housings secured to said ring and outer rim and extending transversely thereof, and a spring for each housing having its terminals secured to said inner rim, intermediate portions of each of said springs having coils extending transversely of the rims, the central portion of the spring being inclosed in its corresponding housing.

2. A vehicle wheel comprising an inner rim, a split outer rim therefor, an annular ring engaging the inner surface of the outer rim, a plurality of housings arranged in spaced relation around the inner surface of said annular ring, threaded extensions carried by said housings and projecting through said annular ring and outer rim, fastening devices mounted on said extensions and engaging the outer surface of the outer rim for securing said housings in position, the central portion of the spring being inclosed in its corresponding housing.

3. A vehicle wheel comprising inner and outer rims, a plurality of springs interposed between said rims, each of said springs having its terminals secured to the inner rim, the portions of said spring contiguous to said terminals converging and terminating in coils extending transversely of said rims, and a central portion formed by a continuation of the inner ends of said coils.

4. A vehicle wheel comprising inner and outer rims, a plurality of springs interposed between said rims, each of said springs having its terminals secured to the inner rim, the portions of said spring contiguous to said terminals converging and terminating in coils extending transversely of said rims, a central portion formed by a continuation of the inner ends of said coils, and a housing for the central portion of each spring.

5. A vehicle wheel comprising inner and outer rims, a plurality of housings secured to said outer rim, and a spring for each housing, the intermediate portions of each spring having coils extending transversely of said rim, the central portion of each spring being inclosed in its corresponding housing.

6. A vehicle wheel comprising inner and outer rims, a plurality of springs interposed between said rims, each of said springs having converging portions terminating in coils extending transversely of said rims, and a central portion formed by a continuation of the inner ends of said coils.

ALPHONSE GIBEAULT.

Copies of this patent may be obtained for five cents each, by addressing the "Commissioner of Patents, Washington, D. C."